Feb. 5, 1935.  F. B. MULFORD ET AL  1,990,304
COMBINED RECORDING AND REGISTERING POSTAL SCALE
Filed June 9, 1930   13 Sheets-Sheet 5

Inventors
Frank B. Mulford &
Raymond D. Schnoor
By Cheever, Cox & Moore
Att'ys

Inventors
Frank B. Mulford &
Raymond D. Schnoor
By Cheever, Cox & Moore
Atty's

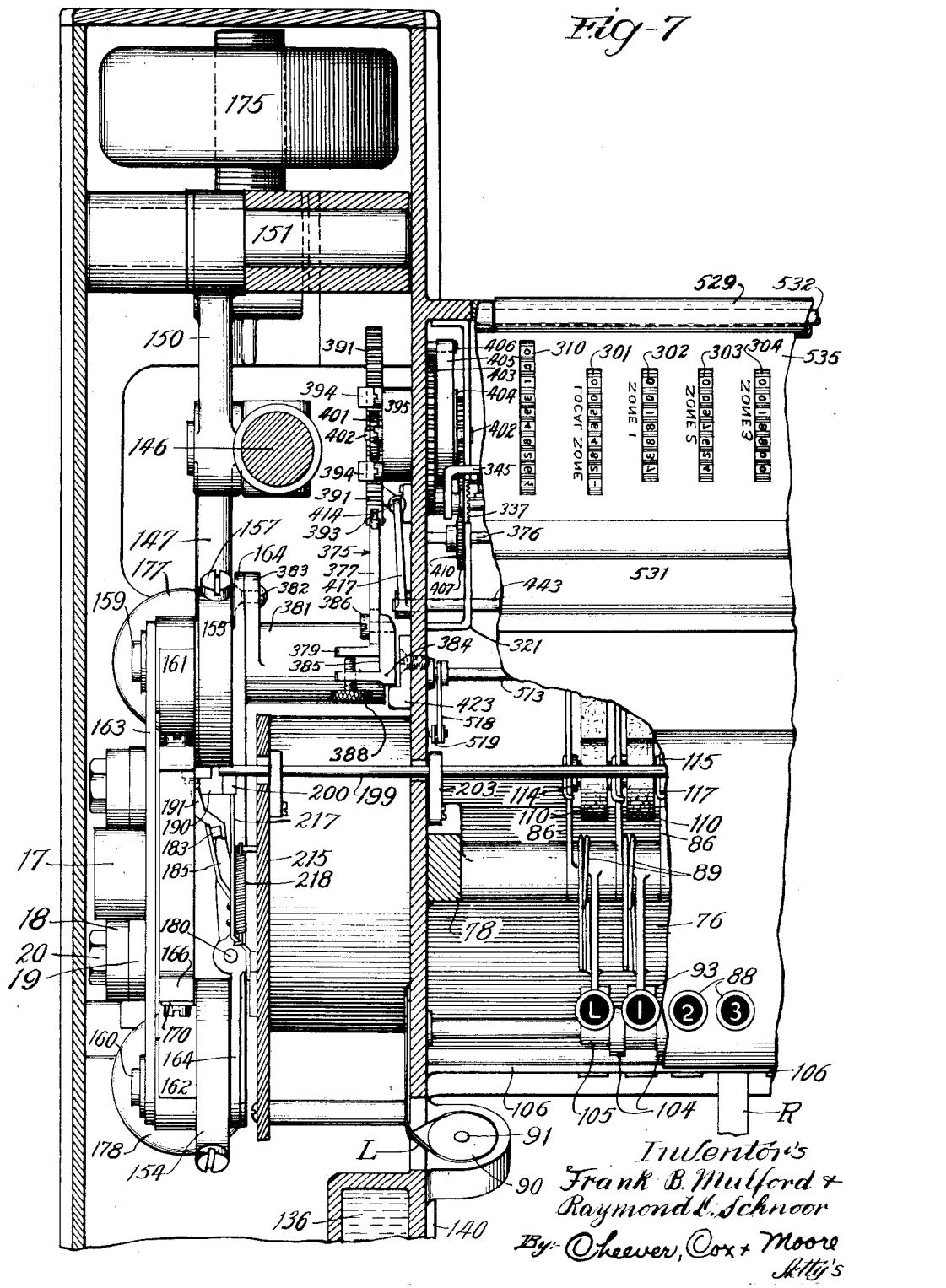

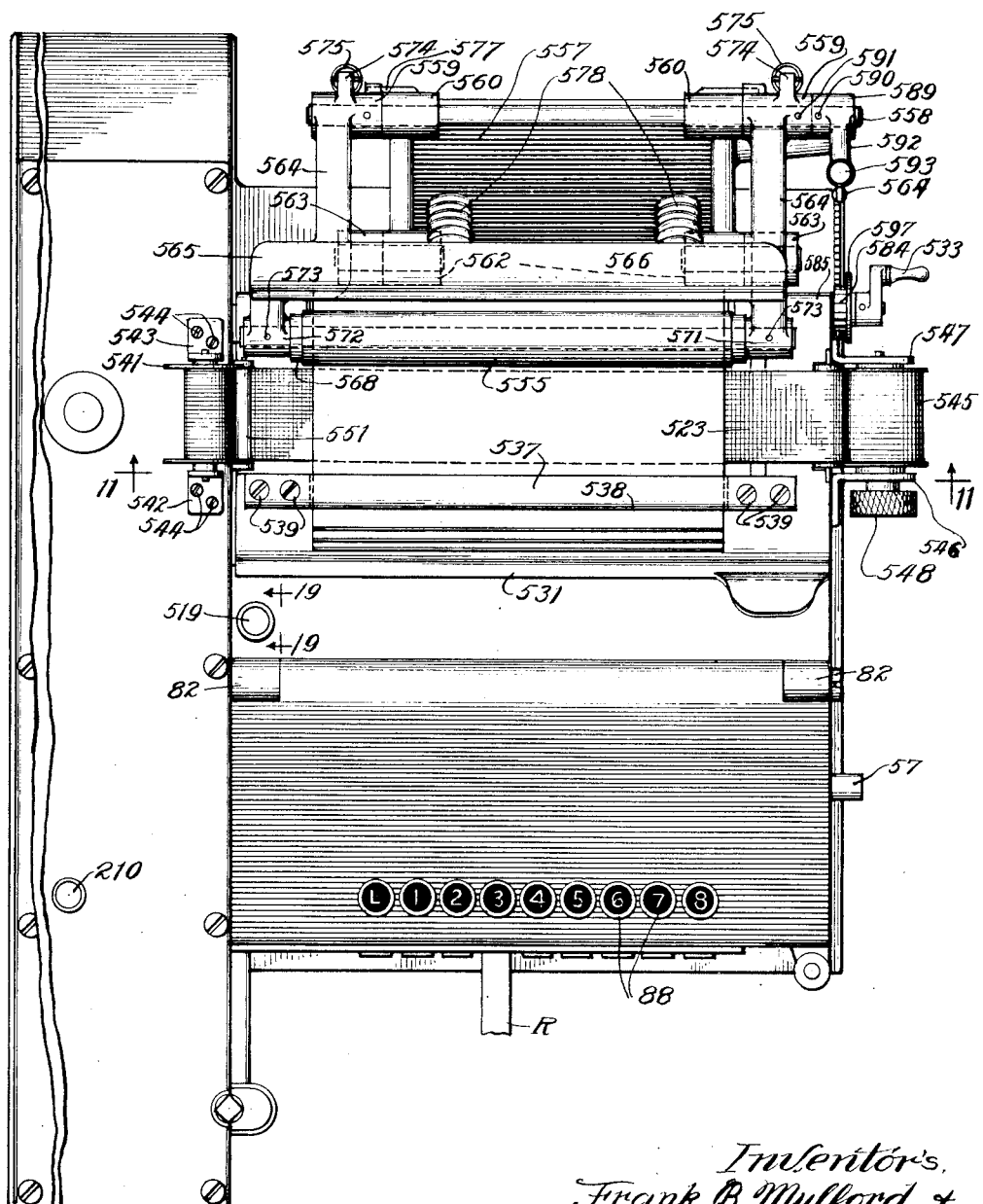

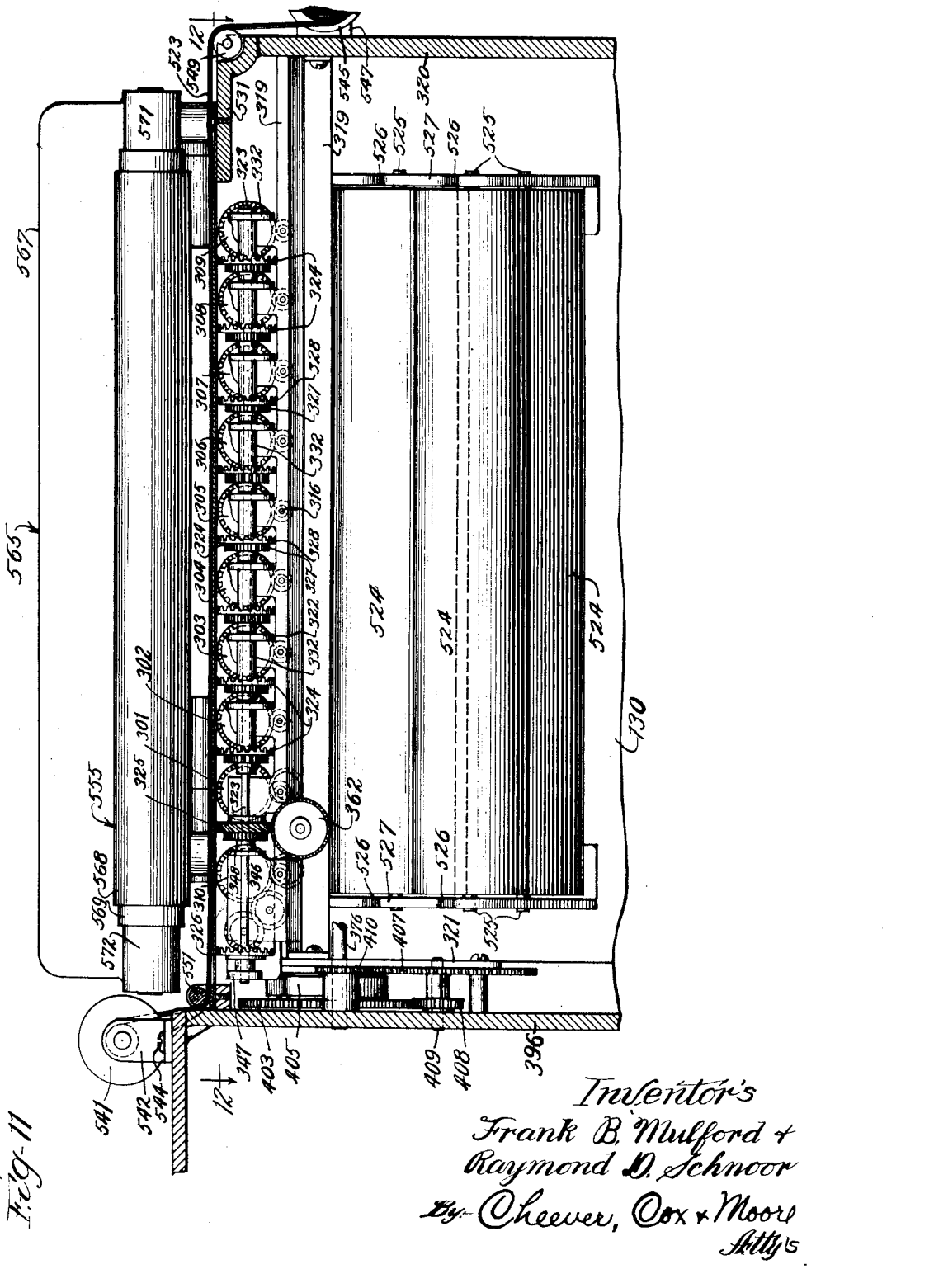

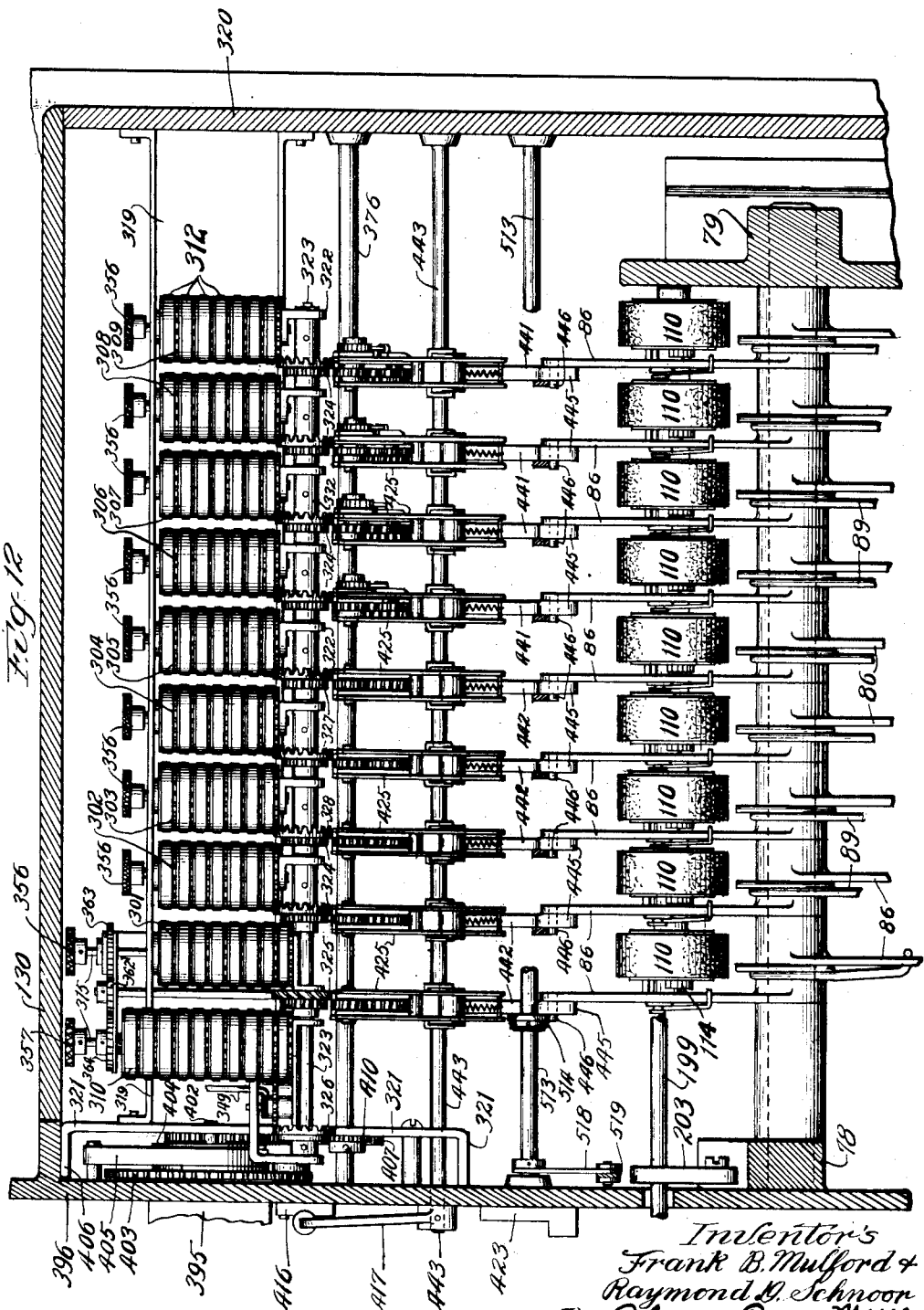

Feb. 5, 1935. F. B. MULFORD ET AL 1,990,304
COMBINED RECORDING AND REGISTERING POSTAL SCALE
Filed June 9, 1930 13 Sheets-Sheet 11
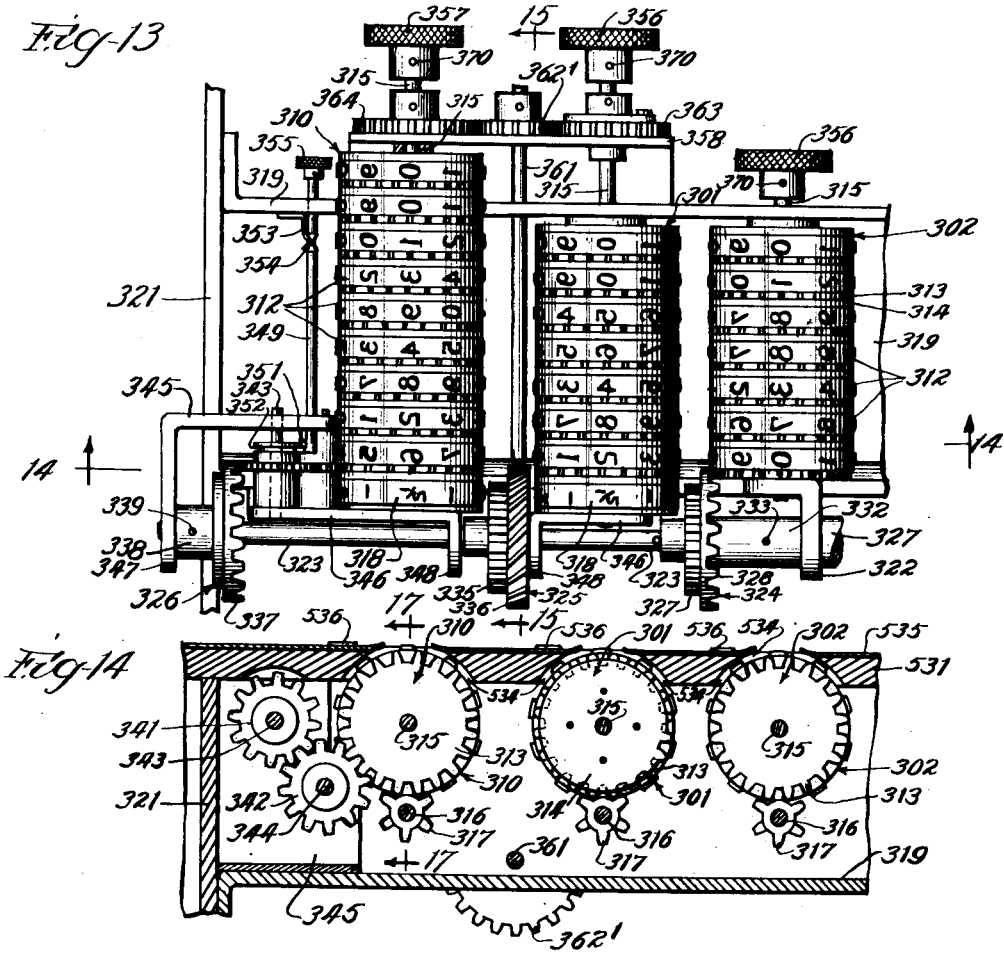
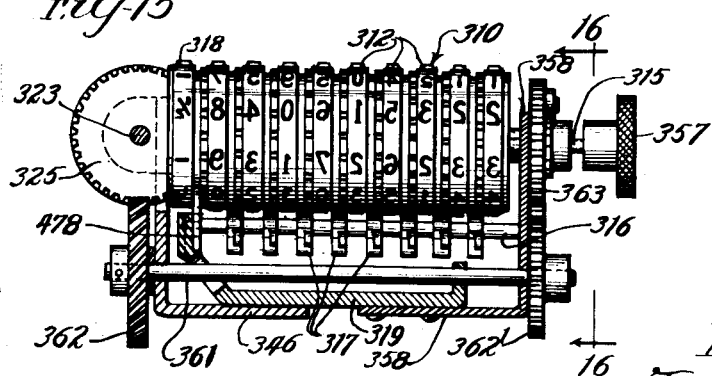
Inventors
Frank B. Mulford &
Raymond D. Schnoor
By Cheever, Cox & Moore
Attys

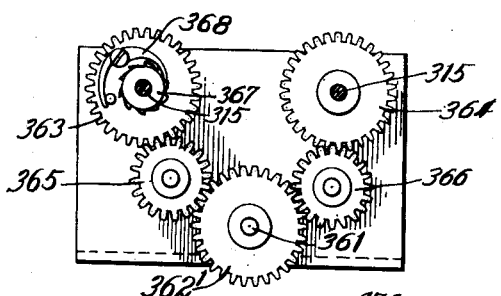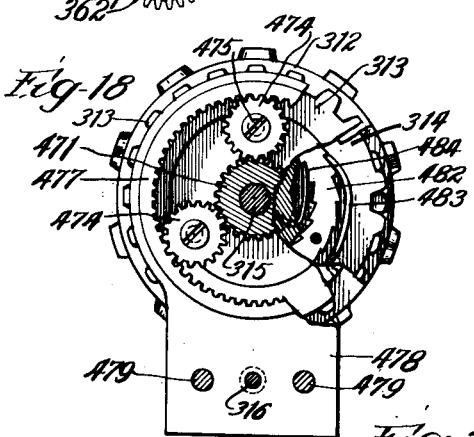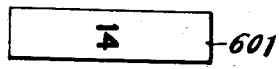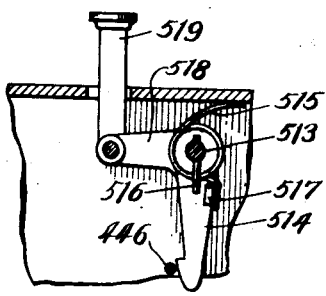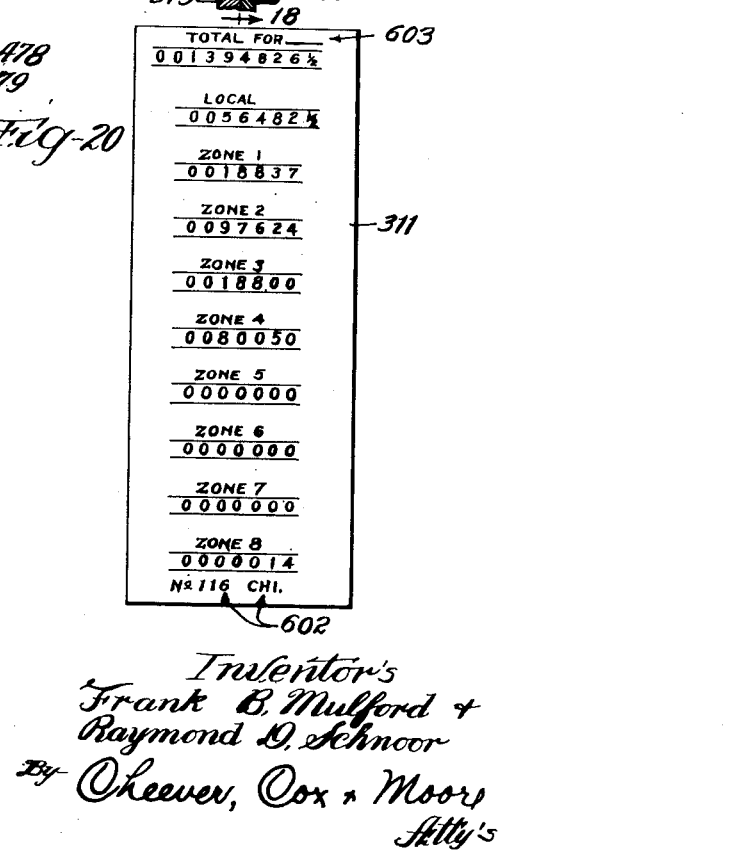

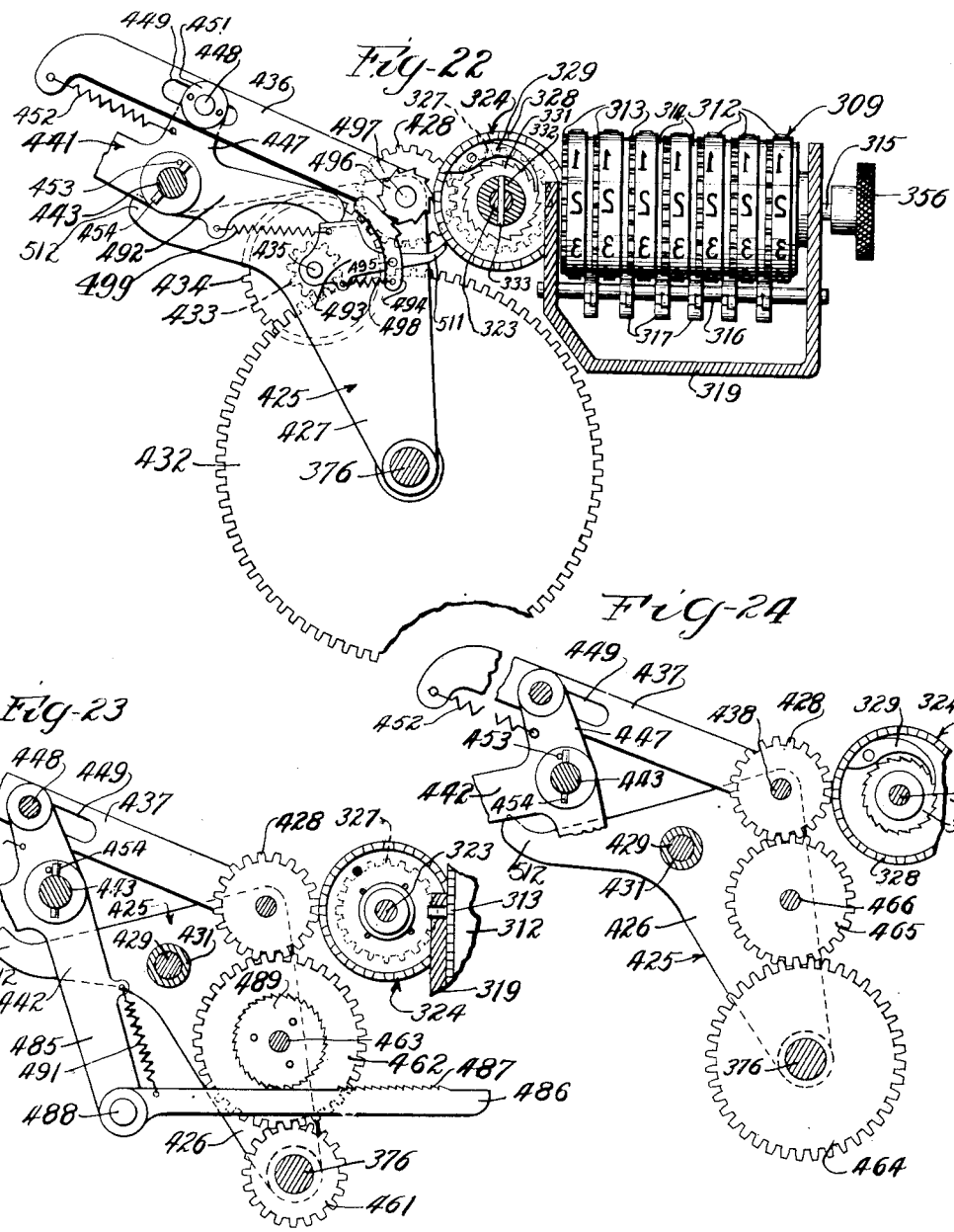

Patented Feb. 5, 1935

1,990,304

UNITED STATES PATENT OFFICE 1,990,304

COMBINED RECORDING AND REGISTERING POSTAL SCALE

Frank B. Mulford and Raymond D. Schnoor, Chicago, Ill., said Schnoor assignor to said Mulford Application June 9, 1930, Serial No. 459,919

16 Claims. (Cl. 235—58)

This invention relates in general to a postal scale and more particularly to a combined weighing, computing, and recording and registering mechanism particularly adapted to postal use and the like.

The invention embodies features of United States Patent 1,471,000, issued to F. B. Mulford, et al., October 16, 1923, for a Computing mechanism particularly adapted for determining postage required for mailing packages to any one of the several postal zones and for delivering stamped tickets for attachment to the packages to serve as postage therefor.

It is an object of this invention to provide mechanism for determining values depending on two variables, such as the weight of an article or package and the postal rate for the delivery of the package to any one of several zones, and in addition thereto, to record the values of one of the variables, such as the postal rate.

An object is to provide mechanism for delivering a medium or ticket having recorded thereon the postage charge, for an article weighed, that may be attached to the article and for delivering one or more similar tickets at selected intervals having recorded thereon the total value or postal charge for all articles or packages weighed within pre-determined periods.

Another object is to provide a mechanism adapted for use with postage determining devices and the like, and for recording and registering the postage, or to provide means for recording, computing, and registering values, such as postage, which are successively indicated by a weighing or value determining device, and such a means which may be operated by the weight determining device without interfering with the operation thereof.

Another object is to provide such a device which will receive energy from the weighing mechanism with which it is associated, and which will utilize some of the reaction of the weighing mechanism for actuating the recording and computing and registering devices.

Another object is to provide instrumentalities for delivering record slips, singularly or in multiple, bearing the record of all articles weighed within a period of time and identifying the machine upon which the articles have been weighed and further bearing the record of the amount of postage determined for each one of the respective postal zones.

Another important object is to provide such a mechanism which may be readily adjusted to the movement of the weight determining devices incidental to weighing articles, so that the recording and registering mechanism may be adjusted to agree with the weight determining devices.

Another object is to provide mechanism adapted to cooperate with a scale or the like for recording and registering a variety of values individually and collectively.

Another object is to provide mechanism for determining postal rates, means for recording and registering the rate for the several postal zones individually, and devices cooperating therewith for recording and registering a surcharge for each article upon which the rate is determined and in any one of the several zones.

Numerous other objects and advantages of the invention will be apparent as it is better understood from the following description, which, taken in connection with the accompanying drawings, discloses a preferred embodiment thereof.

Referring to the drawings:—

Figure 2:
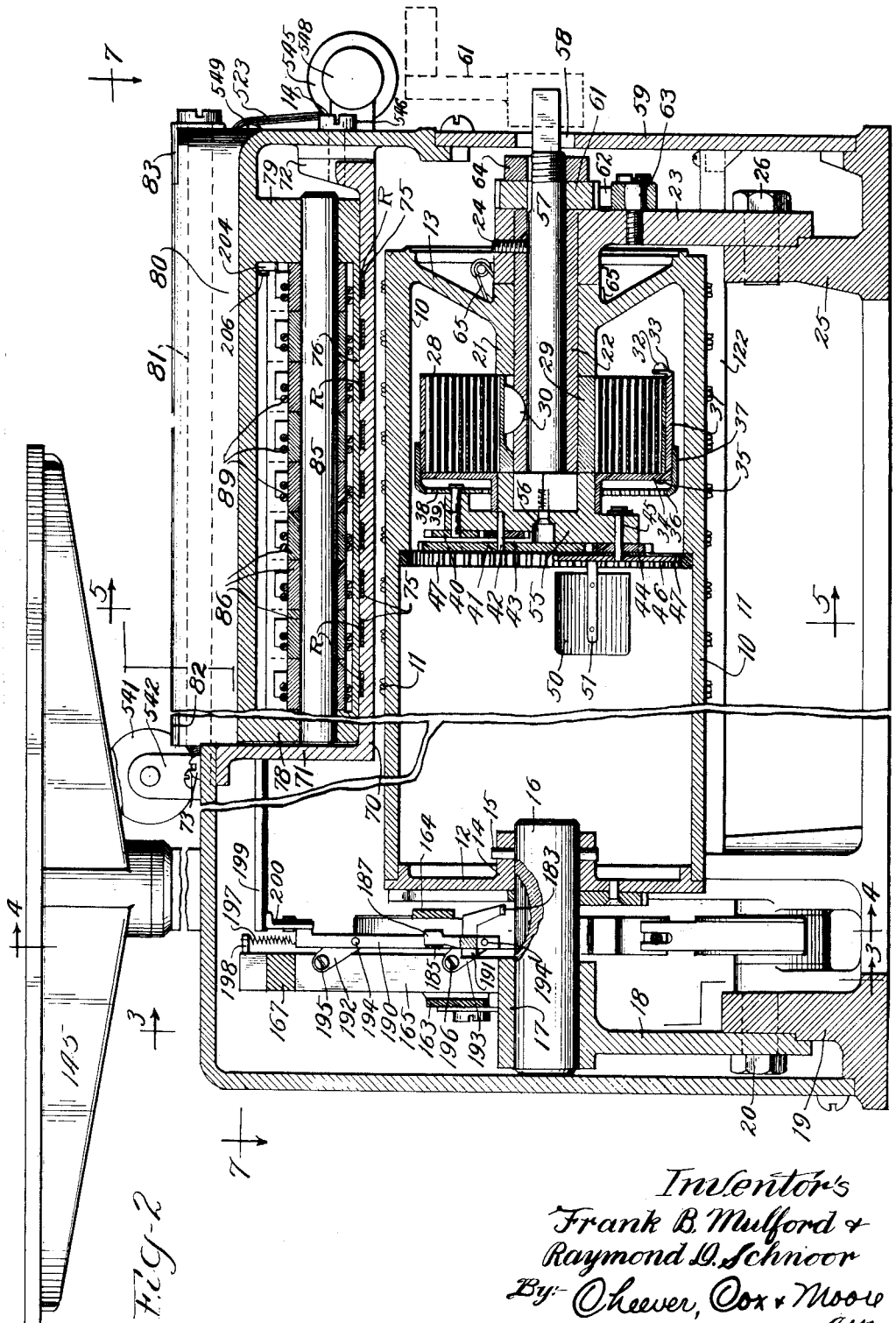
Fig. 2 is a longitudinal sectional view of the device shown in Figure 1, and taken substantially on line 2—2, in Figure 1.
Figure 3:
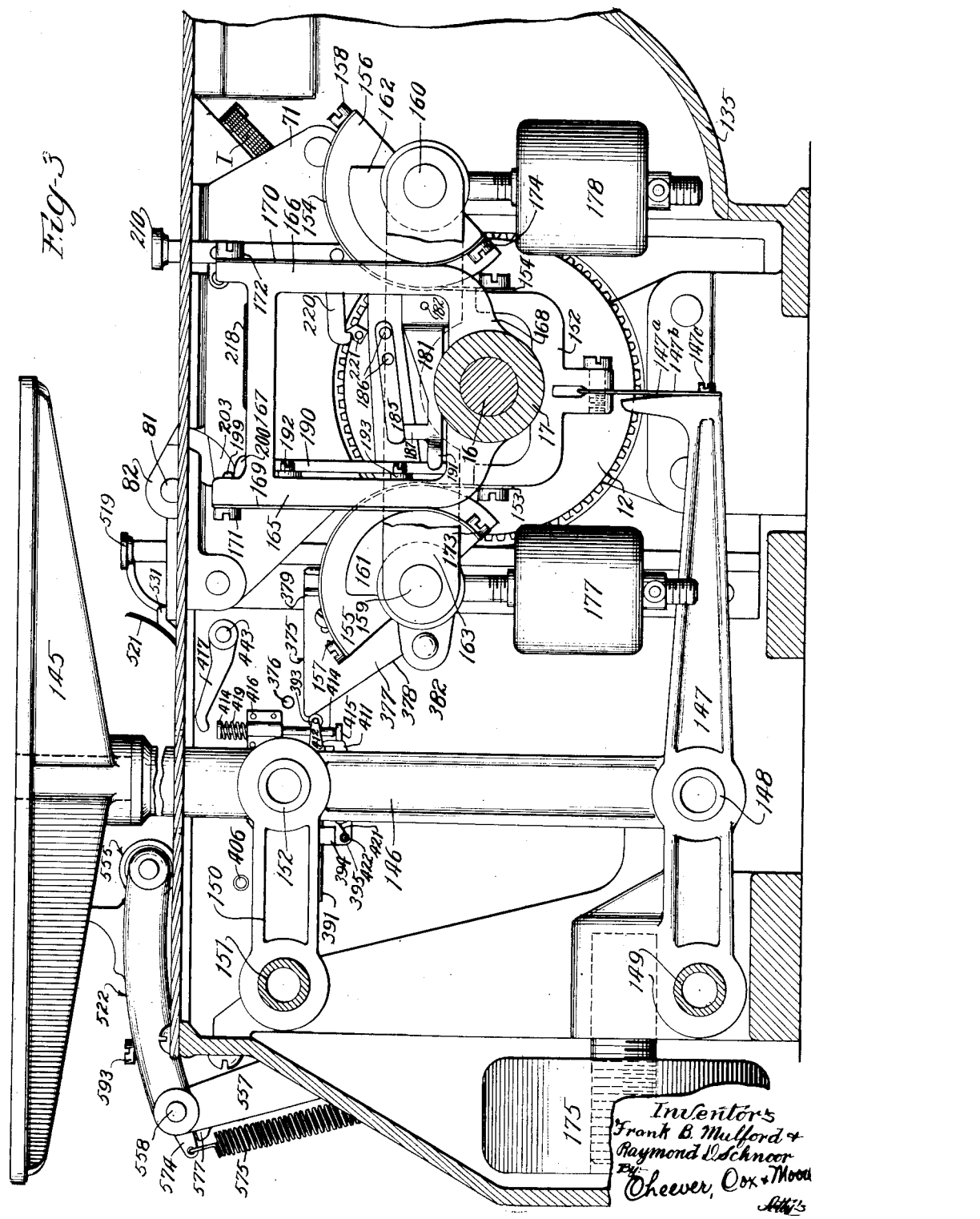
Figure 4:
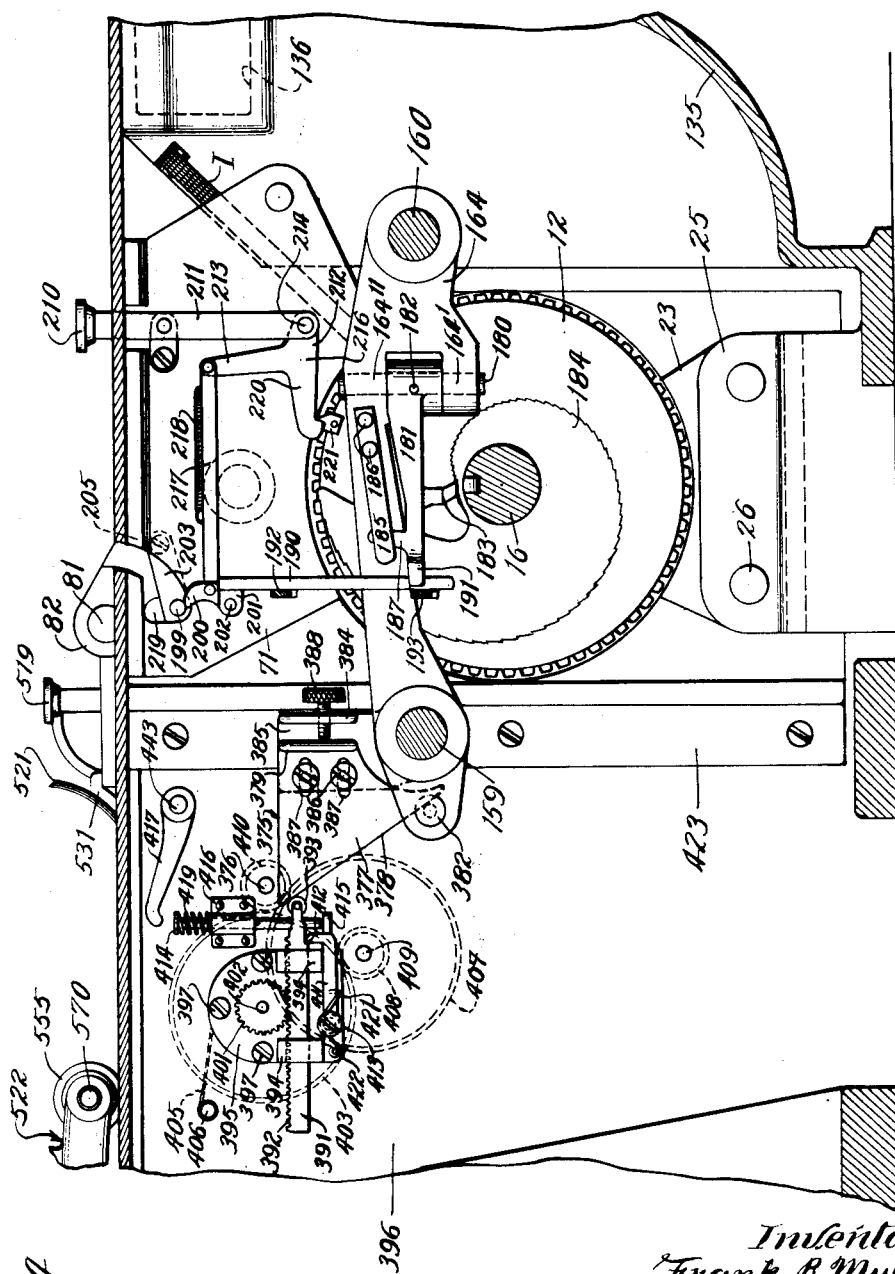
Figure 5:
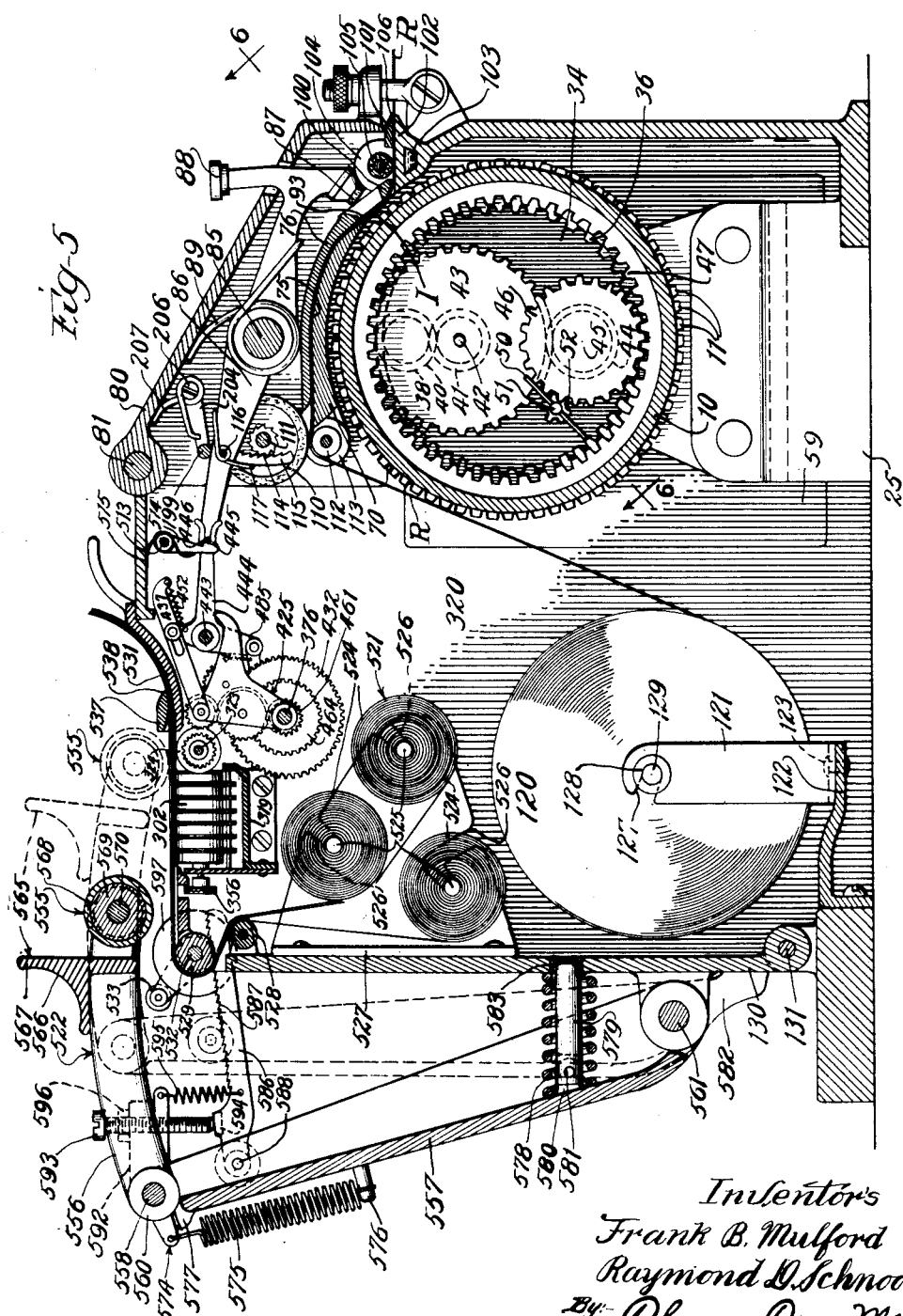

Figs. 3, 4 and 5, are vertical transverse sections taken substantially on lines 3—3, 4—4, and 5—5, respectively in Fig. 2.

Figure 6:
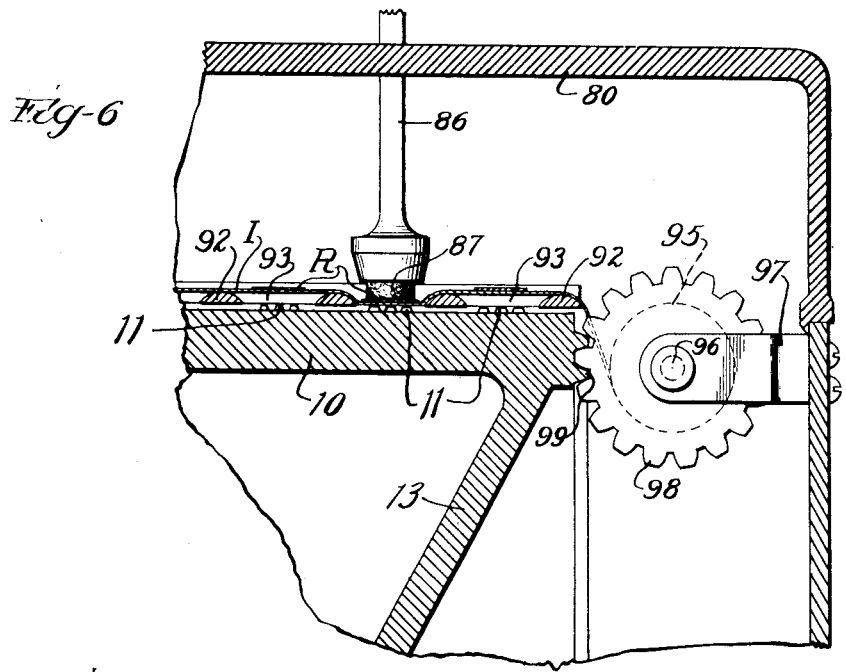

Fig. 6 is an enlarged fragmentary section taken substantially on line 6—6, in Fig. 5, illustrating the printing action of the type drum or cylinder and a key.

Fig. 7 is a longitudinal section taken substantially on the irregular line 7—7, in Fig. 2.

Figure 1:
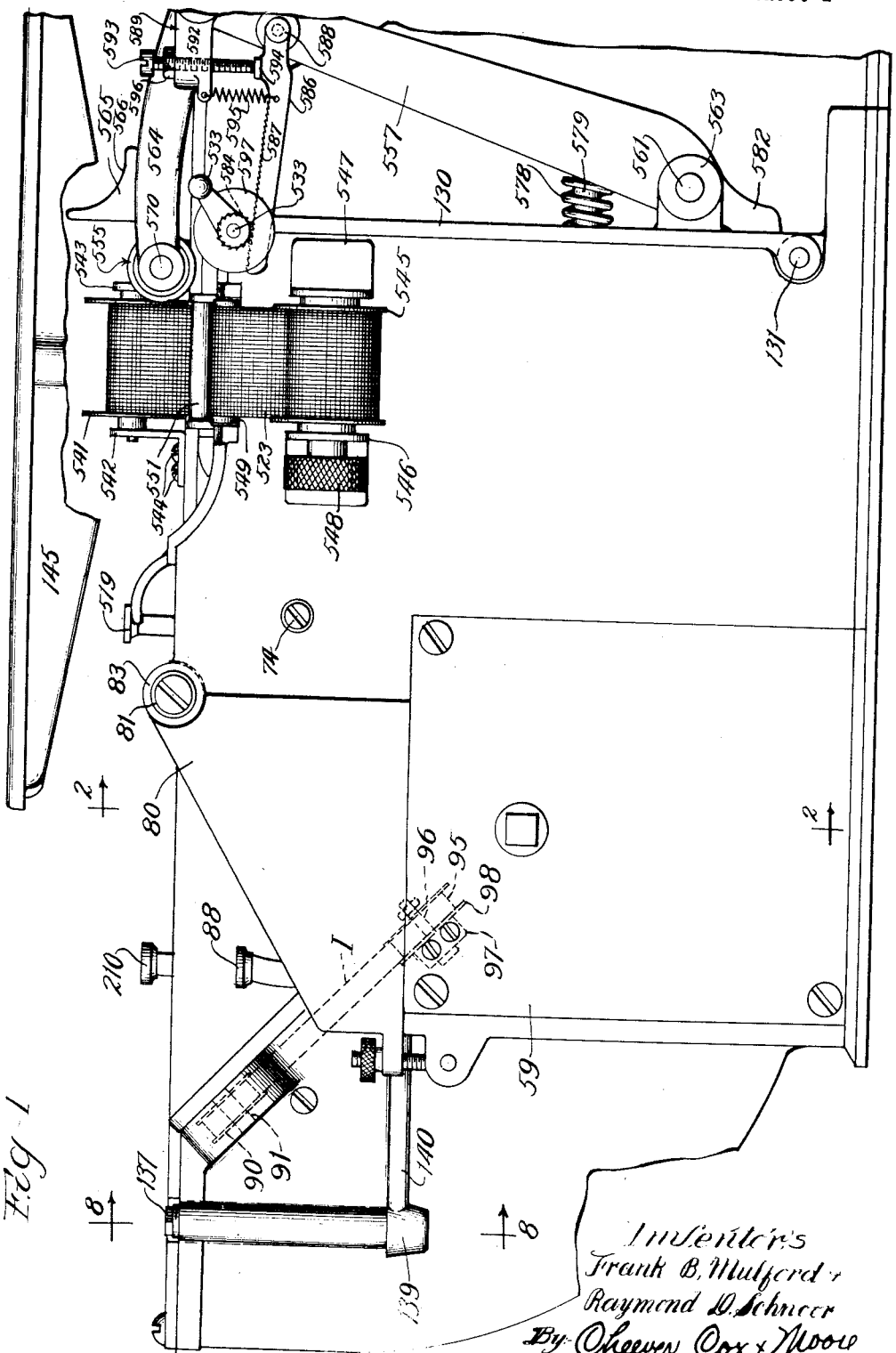
Figure 1 is an end elevational view of a mechanism embodying the invention.
Figure 8:
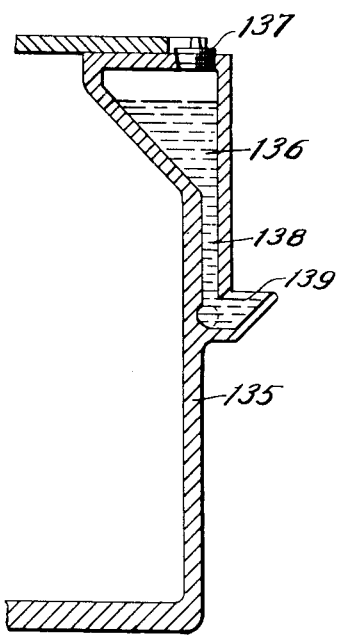

Fig. 8 is a vertical section taken substantially on line 8—8, in Figure 1.

Figure 9:
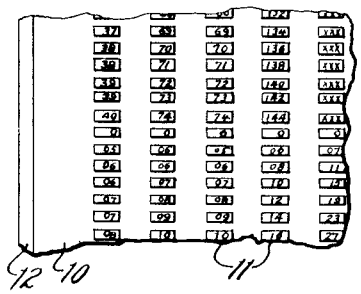

Fig. 9 is a fragmentary plan view of the type drum.

Fig. 10 is a plan view of the device shown in Figure 1, and embodying the invention.

Fig. 11 is a vertical section taken substantially on line 11—11, in Fig. 10, and illustrating a preferred arrangement of the registering devices.

Fig. 12 is a horizontal section taken substantially on line 12—12, in Fig. 11, and further illustrating the registering devices.

Fig. 13 is an enlarged horizontal detail view of parts of the registering devices.

Fig. 14 is a vertical secton taken substantially on line 14—14, in Fig. 13, showing certain drives and transfer wheels.

Fig. 15 is a similar detail section taken substantially on line 15—15, in Fig. 13, further illustrating drives and transfer wheels.

Fig. 16 is a similar section taken substantially on line 16—16, in Fig. 15.

Fig. 17 is a section taken substantially on line 17—17, in Fig. 14, showing details of the type wheels.

Fig. 18 is a section taken substantially on line 18—18, in Fig. 17, showing mechanism for transfering the fractional units.

Fig. 19 is a section taken substantially on line 19—19, in Fig. 10, showing a form of release key.

Figs. 20 and 21 are detail views of the printed slip and record slip, and,

Figs. 22, 23, and 24 are enlarged fragmentary detail views partly broken away and illustrating the transfer mechanism and devices for adding surcharges.

The present embodiment of the invention includes a recording mechanism and a scale or weight determining mechanism of the type shown and described in the above mentioned United States Patent Number 1,471,000, and a computing and registering mechanism arranged to cooperate therewith to provide totals.

*The recording mechanism*

The computing mechanism comprises a cylindrical drum 10, the periphery of which supports a plurality of rows 11, of type figures, the figures of each row of which are arranged in ascending values corresponding to the postal charges for a given zone. As shown in Figure 9, the zero positions of all of these rows lie in a line extending longitudinally of the drum, and substantially parallel with the axis thereof. For the sake of clearness, the type in this view have been reversed so as to read as the impressions would be printed. The drum 10, is provided with two end plates, 12 and 13, respectively, the first of which is provided with a hub 14, to which is secured by means of the pin 15, one end of a shaft 16. The opposite end of the shaft 16, is rotatably mounted in a bearing 17, which is supported by the pedestal 18. The pedestal 18, is in turn secured to a flange 19, extending upwardly from the base casting of the machine by means of screws 20, or in any other suitable manner. The opposite end plate 13, is provided with a hub 21, which is journaled upon a sleeve 22. The outer end of the sleeve 22, is secured in a bore in the upper end of the pedestal 23, by means of a set screw 24, which prevents the sleeve from rotating. The pedestal 23, is removably secured to the upstanding flange 25, forming a part of the base casting by means of a screw 26.

For rotating the drum 10, upon the supports just described, we provide a spiral spring 28, the inner end of which is secured to a sleeve 29, which, in turn, is rigidly secured to the sleeve 22, by means of the key 30. The opposite end of the spring is secured to a rotatable sheet metal drum 31, by having its end wrapped about the pin 32, one end of which extends through a projecting ear 33, forming a part of the drum, and the other end of which extends through the end 34, of the drum as shown at 35. An internal gear 36, is secured to the drum 31, by means of the flange 37, which is formed integral with said gear. This gear meshes with a pinion 38, rigidly secured to one end of the shaft 39. The opposite end of the shaft 39, has a gear 40, rigidly secured thereto, which meshes with a pinion 41, which in turn is rigidly secured to a shaft 42, to the outer end of which is secured a large spur gear 43. The spur gear 43, drives a pinion 44, which is rigidly secured to the shaft 45. The outer end of the shaft 45, has a spur gear 46, rigidly secured thereto, which meshes with the internal gear 47, which is suitably secured to the inner wall of the drum 10. The gearing just described forms a multiplying gear system connecting the spring 28, in driving relation with the drum 10, and since, as it will appear, the drum 10, requires but very little power for rotating it, one winding of the spring 28, will serve to drive the drum 10, through a large number of complete revolutions.

For a purpose which will later appear, we prefer to provide means for controlling the speed of revolution of the drum 10, and for this purpose we provide an air vane 50, which is secured to one end of the shaft 51. The shaft 51, is connected to the gear 46, by a pinion 52, (Fig. 5), in such manner that when the drum is rotated the vane 50, will rotate at comparatively high speed, thereby setting up a resistance tending to slow down the movement of the drum. The shafts 39, 42, 45, and 51, all find suitable bearings in the plate 55, which is rigidly secured to the inner end of the winding stem 57, by a screw 56, which is rotatably mounted in the sleeve 22, and the outer end of which projects through an opening 58, in the cover plate 59, and is provided with a suitable handle 60, by means of which it can be rotated to wind the spring in a manner which will be described later on. The drum 31 is mounted to rotate on a hub portion of the plate 55 as indicated (Fig. 2). To prevent backward rotation of the stem 57, we secure a ratchet 61, thereto, which is engaged by a suitable pawl 62, pivotally mounted upon the pedestal 23, by means of a screw 63. The ratchet is held upon the stem 57, by means of a nut 64.

In the embodiment of the invention disclosed herein, the spring 28, is wound in such direction that during the operation of the machine the upper side of the drum in Figure 2, rotates away from the observer. To wind the spring, the handle 60, is turned in the opposite direction, thereby carrying the plate 55, and the various shafts and gears mounted thereon with it in the same direction. During the winding operation, the drum is held stationary by means of a spring-pressed pawl 65, which is pivotally mounted upon the upper end of the pedestal 23, and which engages suitably formed ratchet teeth 65, on the hub of the end plate 13, to prevent the drum from rotating in the direction in which the handle 60, is being turned.

We shall now describe the means which co-act with the type of the various rows of type figures to make printed impressions upon paper ribbons, one side of which are gummed so that they can be secured to the packages weighed. Referring for the present to Figures 2 and 5, a transversely curved supporting plate 70, is supported above the drum 10, by means of the up-turned flanges 71, and 72, which are respectively secured to the housing by the screws 73, and 74. A plurality of shallow grooves 75, extend transversely of the upper surface of the plate 70, for receiving the paper ribbons R. The ribbons are held in the slots 75, by means of a second plate 76, the lower side of which conforms to the curvature of the plate 70. The plate 76, is carried by the downwardly projecting flanges 78, and 79, of the cover plate 80, which forms a part of the housing, and which is pivotally mounted upon the pintle 81. The ends of the pintle 81, are supported by the lugs 82, and 83, projecting from the adjacent stationary portions of the housing.

A stationary shaft 85, has its opposite ends secured in and supported by the flanges 78, and 79, of the cover plate, and extends just above and parallel with the plate 76. A plurality of levers 86, are rotatably supported side by side upon the shaft 85, there being one of these levers for each of the ribbons R. At their forward ends, these levers each support a platen 87, and a key 88. The platens 87, are adapted to cooperate with the type of the corresponding rows 11, to make impressions upon the associated paper strips R. A spring 89, coiled around the hub of each of the levers 86, and having one end in engagement with the cover, and the other pressing against the lower side of the lever, provides means for holding the lever in its normal or retracted position. The keys 88, are each provided with a character indicating one of the postal zones.

It is possible to make the type of the rows 11, of such character as to make perforated impressions in the paper ribbons, but we prefer to provide means for making inked impressions, and for this purpose we provide the inking ribbon I, (see Figs. 1, 3, 4, 5, 6, and 7), which is supplied from a spool 90, which is rotatably mounted upon a pivot pin 91, shown in Fig. 7, and passes downwardly and beneath and then horizontally between the paper ribbons R, and the bars 92, formed by the apertures 93, in the plate 76, through which the platens 87, are adapted to pass. A takeup spool 95, is rotatably mounted upon the pin 96, which is supported from the casing by a suitable bracket 97. A worm gear 98, is secured to one side of the spool 95, and is adapted to be engaged by the spiral thread 99, formed on the outer end of the drum 10. The pitch of the thread 99, is such that the gear 98, will be advanced one tooth for each revolution of the drum 10. In this manner, the inking ribbon I will be advanced a distance proportional to the pitch of the gear 98, thereby insuring a new inking surface for each impression made by the platens 87, although it will, of course be apparent that the same portion of the ribbon must be used more than once in passing from the extreme left hand end of the drum in Fig. 2, to the right hand end, but the number of impressions thus made will not be sufficient to exhaust the ink of the ribbon.

By means about to be described, the paper ribbons R can be advanced through the guideway 75,-and underneath the two longitudinally extending bars 100, and 101, which are spaced apart from each other as shown in Fig. 5, and also vertically spaced from the top of the supporting plate 102, which forms a cover for the water trough 103. At suitably spaced intervals, the plate 102, is provided with openings through which the felt disks 104, can project into the trough 103. These disks are provided with axial extensions or smaller disks 105, which project over the portions of the supporting plate 102, which support the paper ribbons and thus provide means for moistening the outer surfaces of the ribbons R which are preferably gummed. By providing means for moistening the outer side of the ribbons R, we make it possible to print on the un-gummed surface of the ribbon. The bar 101, is provided with a knife edge 106, which can be used in detaching the printed portion of the paper ribbon.

For advancing the paper ribbons through the corresponding guideways, we provide a plurality of friction rolls 110, which can be made of rubber or any other suitable material, and which are rotatably mounted upon the shaft 111, which extends longitudinally of the cover plate, and has suitable bearings in the two end portions of the cover plate. A lower friction disk 112, coacts with each of the upper disks 110, and is provided with side flanges 113, to assist in guiding the ribbon. A ratchet 114, is secured to each of the disks 110, to rotate therewith, and during the return stroke of the platen is engaged by a pawl 115, which is pivoted at 116, to the rear end of the lever 86, and which is held in engagement with the ratchet 114, by the spring 117, which is coiled about the pin 116, and has one end bearing against the pawl 115, and the other end of which reacts against the upper edge of the lever 86. With this construction it will be seen that after a platen 87, has been moved downwardly to make an impression upon any given ribbon R, and is then released, the lever 86, will be returned to its normal position by the spring 89, and at the same time the pawl 115, will engage the ratchet 114, to rotate the disk 110, which by co-acting with the disk 112, will cause the paper strip to be advanced through the guide-ways 75, and between the bars 100 and 101, and the supporting plate 102, and project beyond the knife edges 106, in position to be torn off by the operator, and applied to the package weighed.

The paper ribbons are fed from suitable supply rolls 120, Fig. 4, which are supported by sheet metal brackets 121, the lower ends of which are secured to a plate 122, extending lengthwise of the machine by rivets 123, as shown in Fig. 5. The ends of the brackets 121, have inclined slots 127 formed therein for receiving the spools 128, the heads 129, of which engage the brackets 121, and thus prevent the spools from being dislodged by movements in directions parallel with their axes. By thus supporting the spools of ribbon, they can be separately removed and replaced without interfering with the remaining ribbons. A cover 130, which is pivoted at 131, to the base portion of the casting can be swung rearwardly to permit access to the paper ribbons. In Figs. 1 and 8, we have illustrated the means which we provide for supplying water to the trough 103. One end 135, of the housing has a chamber 136, formed therein, which is sealed by an air-tight closure 137. A channel 138, is formed in the housing, and leads downwardly from the bottom of the chamber 136, to a well 139, which communicates with the trough 103, through the conduit 140, formed integrally with the end well 135. The upper side of the well 139, is open to permit a finger to be inserted therein for closing the lower end of the channel 138. With the channel 138, thus closed, the chamber 136, can be filled with water and the closure 137, replaced to seal the upper end of the chamber 136. When the finger is then removed, water will run into the well 139, the conduit 140, and the trough 103, filling these receptacles until the level of the water in the well 139, reaches the lower end of the channel 138, when the flow of water will cease, and will be resumed only when water is drawn from the trough 103, by the moistening devices described above.

*Weight determining mechanism*

Having thus described the means by which the impressions corresponding to the type figures on the drum can be made, we shall next describe the means for determining the proper position of the drum for printing upon the proper strip a number indicating the proper postal charge to be made for any given package mailed to any given zone including surcharges. For this purpose, we have herewith illustrated portions of a standard weighing mechanism comprising a platform 145, for receiving the articles or packages to be weighed. This platform is supported by a post 146, (Fig. 3) the lower end of which is supported by and pivotally secured to the lever 147, by the hollow pin 148. The lever 147, has one end pivotally mounted upon the pin 149. A link 150, is pivotally supported upon the pin 151, and its opposite end is connected with the upper end of the post 146, by a pivotal connection 152. The length of the link 150, is equal to the distance between the pivot pins 148, and 149, so as to cause the post 146, to move up and down in a vertical direction.

The free end of the lever 147 is provided with an arcuate surface, for co-acting with the strap 147b, the lower end of which is secured to the lower end of the arcuate surface 147a, by a screw 147c, and the upper end of which is secured to a yoke 152, which is supported by the straps 153 and 154, which are respectively wrapped about and supported by the cams 155, and 156, the ends of the straps being secured to these cams by the screws 157, and 158, respectively. These cams are rigidly secured to the shafts 159, and 160, respectively, to which are also secured the smaller cams 161, and 162, respectively. The shafts 159, and 160, are rotatably mounted in the opposite ends of a second yoke formed by the bars 163, and 164, (see Figs. 4 and 7) between the respective ends of which the two sets of cams referred to above are respectively mounted. This yoke surrounds a frame comprising the vertical side members 165, and 166, and the cross bars 167, and 168. The latter bar comprises two lateral extensions from the bearing 17, which is supported by the pedestal 18, and supports the two vertical side members 165, and 166. Two straps 169, and 170, have their upper ends secured to the upper ends of the vertical side members 169, and 170, by the screws 171, and 172, respectively, and their lower ends secured to the lower ends of the cams 161, and 162, respectively by the screws 173, and 174, respectively.

The lever 147 is balanced by a suitable adjustable counterweight 175, and the two shafts 159, and 160, are also provided with adjustable counterweights 177, and 178, respectively.

The weighing mechanism described above embodies certain modifications of a standard weighing mechanism to adapt it to the purpose at hand, and will give approximately equal increments in deflection for equal increments in load, although this is not a necessary requirement for the construction and proper operation of our improved mechanism, as it can be equally well adapted to the use of a weighing mechanism in which the movements throughout the entire range of the mechanism are not uniform for equal increments in loads.

The bar 164, (Fig. 4) comprises two bifurcations 164', and 164'', in which the pin 180 rotates. The lever 181 extends between these two bifurcations, and has one end secured to the pin 180, by means of a pin 182. Projecting downwardly and inwardly from the lower side of the lever 181, is a pawl 183, which is adapted to engage the teeth of the spiral ratchet 184, the number of teeth on the spiral ratchet corresponding in number to the number of type figures in each of the rows 11, so that for each advance of one tooth of the spiral ratchet, the drum will be advanced to bring the next set of type figures beneath the platen. Since the inner teeth of the spiral ratchet are nearer the axis of the drum 10, than the outer teeth, this means that the length of the teeth must increase from the inner end of the spiral to the outer end thereof, as shown in Fig. 4. We have illustrated these teeth as being of substantially the same height, because, as described above, the weighing mechanism will give substantially equal increments in deflection for equal increments in load.

The lever 181 is yieldingly urged toward the bar 164, by the leaf spring 185, one end of which is secured to the bar 164, by suitable rivets 186, and the other end of which engages a projection 187, extending upwardly from the lever proper. In this manner, the pawl 183, is yieldingly urged toward a position for engaging one of the teeth of the ratchet 184, the particular tooth of which is thus engaged being determined by the vertical position of the pawl 183, which in turn is determined by the weight imposed upon the platform, 145. The projection 187 also acts as a stop to limit the inward movement of the pawl 183, under the tension of the spring 185.

The pawl 183 is normally held out of the path of the teeth of the ratchet 184, by the engagement between the lower end of the link 190, with the laterally offset portion 191, (see Figs. 2 and 7) of the free end of the lever 181. The link 190 is supported by the two links 192, and 193, (Fig. 2) which are pivotally connected at 194, and 194', with the link. The other ends of the links 192, and 193, are pivotally secured to the vertical side member 165, by the screws 195, and 196. (See Fig. 2). The pressure of the spring 185, against the projection 187, and the resulting pressure of the end of the lever 181, upon the link 190, tends to push the link 190 inwardly and thus cause it to move upwardly on its pivot points, due to the tension of the spring 197, one end of which is secured to the upper end of the link 190, and the upper end of which is secured to the vertical frame 165, at 198. The upward movement of the link 190, is, however, resisted by the pressure of the end of the rod 199 (Fig. 4) which rests upon the upper end of a latch 200, which is pivotally mounted upon a projection 201, extending from the upper end of the link 190, by the pin 202. The rod 199 is secured to the free ends of the two links 203, and 204, (Figs. 4 and 5), which are respectively pivotally mounted upon the end members of the cover plate by the screws 205, and 206, respectively. A coiled spring 207, interposed between the top of the cover plate and the link 204, pushes the rod 199 downwardly with sufficient force to overcome the lifting tendencies upon the link 190, of the springs 185, and 197.

For releasing the latch 200, from the rod 199, to permit the link 190, to move upwardly and laterally inwardly so as to cause the pawl 183, to be positioned in the path of the tooth of the ratchet 184, we provide a release key 210, which is supported by the vertical link 211, (see Fig. 4). The lower end of the link 211, is pivotally secured to one end of the bell crank lever comprising the two arms 212, and 213, by means of a pin 214. The bell crank lever is pivotally mounted upon the flange 71, of the supporting plate 70, by means of a screw 216. The upper end of the arm 213, is connected by a link 217, with an intermediate portion of the latch 200. A spring 218, one end of which is secured to the link 217, and the other end of which is secured to the flange 71, yieldingly holds the latch in a vertical position, and at the same time holds the release key 210, in its uppermost position. When the release key 210, is depressed, the latch 200, is withdrawn from beneath the end of the rod 199, which projects through a slot 219, in the flange 71, and thus permits the springs 185, and 197, to move the link 190, upwardly and laterally inwardly thereby causing the pawl 183, to be moved under the tension of the spring 185, into the path of the teeth of the ratchet 184. Continued downward movement of the release key 210, next causes the latch 220, which forms an extension of the bell crank lever to be released from the stop 221, whereupon the drum rotates in a counterclockwise direction, (see Fig. 4) under the influence of the spring 28, until the pawl 183, is engaged by one of the teeth of the ratchet 184, whereupon the drum comes to rest at a position determined by the weight of the object placed upon the platform 145.

Upon the release of the key 210, the spring 218, will cause the latch 200, to move into a position extending above the rod 199, thereby holding the link 190, in its raised position. After the proper printing position of the recording drum 10, has been determined, as described above, the operator will strike the key 88, corresponding to the zone to which the package is to be shipped, thereby causing an indication of the proper postal charge including surcharges to be impressed upon the paper ribbons corresponding to the key pressed. From an inspection of Fig. 5, it will be noted that the upper edge of the inner ends of all of the levers 86, engage the lower side of the rod 199. Consequently, when any one of the keys 88, is depressed, the rod 199, will be raised, thereby pushing the latch 200, laterally out of the path of the rod 199, and permitting it to return beneath the rod 199, under the influence of the spring 218. Upon the release of the key 88, after the printing stroke has been made, the spring 207, will force the rod 199, downwardly against the upper end of the latch 200, thereby moving the link 190, downwardly and outwardly into engagement with the offset end 191, of the lever 181, thus moving the pawl 183, out of engagement with the tooth of the ratchet 184, whereupon the drum will resume its rotation under the tension of the spring 28, and rotate until the stop 221, is re-engaged by the latch 220, which upon the release of the key 210, is again moved into the path of the stop 221, through the action of the spring 218. The operator then tears off the printed portion of the ribbon which has been projected from the machine in the manner described above, and may attach it to the package to indicate the proper postal charge for this package. It will, of course, be understood that if our improved mechanism is merely to be used as an indicating device, the printing mechanism described can be omitted, and the drum will then assume the form of a dial, the numbers of which could be observed through a suitable slot formed in the housing of the machine.

*The computing and registering mechanism*

This mechanism in the present embodiment includes computing and registering devices, gauging means for determining the amounts to be registered, transfer mechanism for transferring the amounts indicated by the gauging means to the computing and registering devices, means for adding a surcharge for each article or package weighed, and means for registering the results or taking stamped impressions from the computing and registering devices.

The computing and registering devices include counter units 301, 302, 303, 304, 305, 306, 307, 308, and 309, each one of which is arranged to compute values or postal charges for a particular unit of a series or one of the postal zones, and a similar counter unit 310, arranged to compute and register the total values or charges for all units of the series or zones. These counter units are preferably arranged to tabulate the results so that a stamped impression may be taken in the form of a ticket or slip 311, (Fig. 20) at desired intervals. Each one of the counter units 302, to 309, inclusive includes a plurality of type wheels 312, (Figs. 11 to 18), each carrying a spur gear 313, and a mutilated gear 314, and rotatably mounted in adjacent relationship along a shaft 315. A countershaft 316, is arranged adjacent the shaft 315, carrying mutilated transfer gears 317, each one of which operates with the mutilated gear of one of the type wheels 312, and the spur gear of another to effect a one-tenth revolution of the type wheel 312, through its respective spur gear 313, for each revolution of the mutilated gear 314, carried by another type wheel 312, as in usual and ordinary computing devices. Obviously the number of type wheels 312, in the units may be increased or decreased in accordance with the requirements or extent of use of the machine. The type wheels 312, are each provided with ten raised or molded characters, representing zero to nine inclusive as indicated, (Figs. 13 to 15, and 17 to 20). The units 301 and 310, are similar except that they are each provided with a type wheel 318, similar to the type wheels 312, except that the characters provided on the wheels 318, represent alternately a dash or hyphen and one-half unit as indicated, (Figs. 13 and 15).

The counter units 301, to 310, inclusive, are supported through their respective shafts 315, in a bearing bracket 319, which is secured to a wall 320, of the housing and a bearing plate 321. The bracket 319, also provides bearings for the several countershafts 316, and bearing lugs 322, are formed thereon for rigidly supporting a drive shaft 323, which is arranged to extend along an end of the counter units for supporting gear units 324, 325, and 326. The gear units 324, include a spur gear 327, and a crown gear 328, rigidly secured together, the crown gears each being arranged to engage the gear 313, of the first type wheel 312, of one of the units 302, to 309, inclusive and provided with a pawl 329, (Figs. 22, 23, and 24), for engaging a ratchet 331, carried by a hub 332, one of which is suitably secured to the shaft 323, by means of pins 333, (Fig. 13), adjacent each of the gear units 324, and adapted to transmit movement thereof to the shaft 323, in one direction only. The pitch of the crown gears 328, is equal to the pitch of the companion gears 313, so that for each one-tenth revolution of these gears one unit of value is added to the computing and registering units 302, to 309, inclusive.

The gear unit 325, is formed of a spur gear 335, similar to the gears 327, and a spiral gear 336, rigidly secured together and rotatably mounted on the shaft 323. This unit 325, is arranged to transmit fractional values such as the values varying in the proportion of one-half cent characteristic of the local postal zone and to avoid interference, these values are carried into the units 301, and 310, by independent transmission devices which will be later described. The gear unit 326, comprises a crown gear 337, rigidly secured to a hub 338, which is secured to the shaft 323, by means of a pin 339, for movement therewith. Rotary motion imparted to the shaft 323, by any one of the gear units 324, is transmitted through the gear unit 326, to the gear 313, of the end type wheel 312, of the total or collective recording unit 310, through idler gears 341, and 342, rotatably mounted on jackshafts 343, and 344, having bearings in bearing plates 345, and 346. These are or may be suitably secured to the bearing bracket 319, in any suitable manner. To insure alignment the bearing plates 345, and 346, also provide bearings 347, and 348, for the shaft 323. Means is preferably provided for disconnecting the gear 337, from the gear 313, to facilitate setting back or cancelling out registrations. This is, or may be, accomplished by shifting the gear 341, along the shaft 343, and out of mesh with its companion gears 337, and 342. A control device formed of a pin 349, mounted in the bracket 319, and plate 345, and having a hooked end 351, is arranged to engage in a peripheral groove 352, in the hub of the idler gear 341. A spring latch 353 is secured to the bracket 319, and by engaging in a groove 354, latches the gear 341, in operative position. A knob or handle 355, may be provided to facilitate operation.

The shaft 315, of each of the registering units 301, to 309, is secured to the first type wheel 312, of each set and provided with a knob 356, which is arranged to facilitate engagement by an operator for resetting the registering units. A similar knob 357, is provided for the unit 310. The knobs 356, and 357, are secured to the shafts 315, by means of pins 370.

The transmission of fractional values into the registering units 301, and 310, is accomplished by transmitting these values to and through the shafts 315, of these units to the fractional type wheel 318, of each unit. A shaft 361, having bearings in a plate 358, and the plate 346, is provided at one end with a spiral gear 362, (Figs. 15 to 18) which is arranged to engage the companion spiral gear 325, carried by the shaft 323, and at its opposite end with a spur gear 362', from which motion is transmitted to spur gears 363, and 364, through suitable idler gears 365, and 366. The gear 364, is pinned to the shaft 315, of the unit 310, and the gear 363, is connected to the shaft 315, of the unit 301, through a ratchet 367, secured to the shaft and a pawl 368, carried by the gear 363, as indicated, (Fig. 16). The ratchet connection permitting independent resetting of the unit 301.

The gauging means for determining the amounts to be registered, (Figs. 3, 4, and 7) include a gauging device 375, associated with or carried by the scale mechanism and means for transmitting motion to the computing and registering devices in proportion to the weighing movement of the scale through an intermediate shaft 376. The gauging device is preferably a slotted plate 377, having an angular cam surface 378, the length and angle of which is determined by the maximum movement of the scale or weighing mechanism to which the plate 377, is attached, and provided with a laterally extending lug 379. A bearing bracket 381, is mounted on the shaft 159, of the yoke formed by the bars 163, and 164, of the scale mechanism and is rigidly attached to the bar 164, by means of a rivet 382, or the like, extending through the bar 164, and a lug 383, formed on the bracket 381. A lug 384, also extends from the bearing bracket 381, preferably vertically which is provided with a substantially flat face 385, against which the plate 377, is clamped preferably by means of spaced screws 386, having threaded engagement with the lug 384, and extending through slots 387, formed in the plate 377, that facilitate adjustment of the plate. Micro adjustment of the plate 377, is effected through a screw 388, having threaded engagement with the lug 384, and engaging the lug 379, of the plate 377, and the screws 386, which may be alternately tightened to provide pivots for the plate 377. The means for co-operating with the gauging device 375, to transmit motion to the intermediate shaft 376, includes a bar 391, provided with rack gear teeth 393, along one edge and carrying an antifriction cam roller 393, in position to engage the cam surface 378, of the plate 377, and transmission elements for amplifying the movement as an incident to its transmission to the shaft 376. The bar 391, is slidably mounted in lugs 394, formed on a bracket 396, which is secured to a wall of the housing by means of screws 397, or the like. A spur gear 401, is arranged to engage the rack teeth 392, of the bar 391, and secured to a shaft 402, which has bearings in the bracket 395, and the bearing plate 321. A relatively large gear 403 is provided having a one way drive connection with a spring drum 404, which is suitably secured to the shaft 402, between the wall 396, and the bearing plate 321. A flat helical spring 405, is engaged in and tends to rotate the drum 404, and the associated gears in a counter-clockwise direction, (viewing Fig. 4) and is anchored on a shouldered pin 406, which is secured to the wall 396 adjacent the gear 403. A double idler including a relatively large gear 407, and relatively small pinion 408, mounted on a jackshaft 409, further amplify and transmit movement of the gear 403, to the shaft 376, through a pinion 410, which is secured thereto. The amplification of movement between the scale or gauge plate 377, is such as to effect a one-tenth revolution of the shaft 376, for each pound, ounce, or other unit of weight indicated by the scale.

A latch 411, engaging in a notch 412, in the bar 391, and pivoted on a shoulder screw 413, normally holds the bar 391, in retracted position as shown, (Fig. 4) and is disengaged from the notch 412, by a plunger 414, engaging a lug 415, on the latch 411, and mounted to reciprocate in a bearing bracket 416, secured to the wall 396. The plunger is actuated by an arm 417, carried by a shaft 418, which will be later described and is retracted by a spring 419, positioned between the head of the plunger 414, and the bracket 416. A spring 421, engaging the latch 411, and a pin 422, on the bracket 395, moves the latch 411, into the notch 412.

A vertically arranged guide member 423, insures perpendicular movement of the scale yoke during registering operations by engaging the lug 384, on the bracket 381.

The present parcel post zones are designated as local zone and zones 1 to 8 inclusive. The postal charges for articles or packages sent to these zones are based on the weight of the package and the zone to which the package is sent, and a surcharge is made on the first pound or for each package. The rate for the local zone being one-half cent per pound with a surcharge of six and one-half cents. For the other eight zones the rate is higher in accordance with the zone and similarly increases uniformly in proportion to the weight of the package, being one cent per pound for the first and second zones with a surcharge of six cents; two cents per pound for the third zone with a surcharge of six cents; four cents per pound for the fourth zone with a surcharge of five cents; six cents per pound for the fifth zone with a surcharge of four cents; eight and ten cents per pound for the sixth and seventh zones respectively with a surcharge of three cents, and twelve cents per pound for the eighth zone with a surcharge of two cents.

To effect the transfer of the series of uniformly increasing values or charges and surcharges a separate transfer mechanism is provided for each postal zone or unit of the series. The shaft 376, extends through the housing parallel to the shaft 323 and spaced therefrom as shown, (Figs. 22 to 24) and cages 425, formed of parallel side plates 426, and 427, and arranged to support a gear 428, and an intermediate gear train are provided, for each unit of the series or postal zone. These cages pivot about the shaft 376, and support the gears 428, in position to engage the gears 327, of the gear units 324.

The side plates 426 and 427 are secured together by a rivet 429, extending through the plates and through a spacer 431. The gear train of each transfer unit consists of suitable gearing for transmitting the movement of the shaft 376, to the gears 428, without change of direction, and changing the ratio between the shaft 376, and the gear 428, in accordance with the rate of increase in the values or postal charges for the particular units of the series or postal zones.

While it is possible to effect various ratios or degrees of amplification by a slight re-arrangement or change in the gear trains, in a machine for registering parcel post charges, only two types of gear trains are required, one being the type shown, (Fig. 22) where a relatively high amplification is required, such as for the fifth to eighth zones inclusive, and the type shown (Figs. 23 and 24) where mere transmission or a slight amplification is required. The arrangement shown (Fig. 22) is particularly adapted for the eighth postal zone where the rate per pound is twelve cents. To amplify the movement of the shaft 376, in the proportion of twelve to one, a relatively large gear is suitably secured to the shaft 376, and operates in idler pinion 433. The ratio between the gear 432 and the pinion 433, is eight to one. An idler gear 434, is secured to the pinion 433, to rotate therewith and meshes with the gear 428, of the transfer unit. The ratio between the gears 434, and the gear 428, in this unit being one and one-half to one. The total amplification between the gears 432, and 428 is twelve to one. The gears 433 and 434 are supported on a jackshaft 435, having bearing in the plates 426 and 427. Obviously for the fifth, sixth and seventh zones it is only necessary to change the ratio of the gears and pinions to effect the required amplifications of six, eight and ten to one. The cages 425, are moved to bring the gears 428 into engagement with the gears 427, by parallel links 436, and 437, engaging the opposite ends of a shaft 438, which also serves as a bearing shaft for the gears 428, and levers 441, and 442. The levers 441, and 442, are arranged along a shaft 443, which extends through the housing parallel to the shafts 376, and 323, one adjacent each one of the transfer units. An arm 444, having a bifurcated end 445, for engaging a pin 446, carried by levers 86, which support the platens 87, of the ticket printing mechanism above mentioned forms a part of each one of the levers 441, and 442, and an arm 447, extends from the levers 441, and 442, carrying a cross pin 448, which extends through elongated slots 449, in the links 436, and 437. Suitable nuts 451, may be provided at each end of the pins 448, for securing the links in operative position. A spring 452, urges the links 436, toward the right, (Figs. 22, 23, and 24).

A pin 453, is mounted in each of the levers 441, and 442, to engage a cross pin 454, extending through the shaft 443, adjacent each one of the arms 441, and 442, and when any one of the arms is actuated by its corresponding levers 86, it carries with it the shaft 443, which moves the arm 417, to depress the plunger 414, above mentioned.

In the gear trains for transmitting the charges in the local zone and zones one, two, three, and four, where low amplification is required, as illustrated, (Figs. 23 and 24) for transmitting movement of the shaft 376, unchanged such as is required in the local zone and in zones one and two, where no amplification is required, a gear 461, (Fig. 23) is secured to the shaft 376, which is equal in diameter to the gear 428, of its respective transfer unit and a suitable idler gear 462 carried on a jackshaft 463, is interposed between the gears 461, and 428. In zone three which requires an amplification of two to one, (Fig. 24) a gear 464, is secured to the shaft 376, having twice the pitch or diameter of the gear 428, of its respective unit and an idler gear 465, carried on a jackshaft 466, is interposed between the gears 464 and 428. Obviously the four to one amplification necessary for the fourth zone is effected merely by changing the ratio between the gear carried by the shaft 376, and the gear 428. For the fractional or half cent units of the local zone, the one to one transfer unit is used as shown, (Fig. 23) and the reduction to fractional values is accomplished in the computing and registering devices 301, and 310, in the unit 301, by connecting the type wheels 318, and 312, through mutilated gears which are arranged to transfer every other fractional unit to the succeeding type wheel 312, so that one unit is recorded on the type wheel 312 for each alternate fractional or one-half unit, and in the recording and computing unit 310, through the type wheel 318, a planetary transmission including a gear 471, formed on the hub of a driving plate 472, to which the type wheel 318, is secured by means of rivets 473, a plurality of idler pinions 474, carried on studs 475, having threaded engagement in a bushing 476, and a ring gear 477, formed in a plate 478, which is rigidly secured to the bearing bracket 319, by means of rivets 479.

A mutilated gear 480, a duplicate of the gears 314, is arranged to carry a type wheel 481 (Figs. 17 and 18) of the first counter unit independent of the gear 313, of that unit and carries a double faced annular ratchet member 482, which is driven through a pawl 483, associated with the gear 313, of the type wheel 481, and pawl 484, associated with the bushing 476, so that computations transmitted through the shaft 315, of this registering unit are transmitted to the mutilated gear 480, and type wheel 481, at a reduction of two to one, through the planetary gears and independent of the gear 313, which is associated with the gear unit 326, and idler gears 341, and 342, and likewise computations entering the unit 310, through the last mentioned gear train will not interfere with the fractional units transmitted through the shaft 315.

The means for registering the surcharges are or may be of two or more forms or arrangements and to accomplish this for the local zone surcharges, an arm 485, is formed on the lever 442, (Fig. 23) of suitable length to effect the required throw and a pawl arm 486, having teeth 487, formed thereon is hingedly connected with the arm 485, as indicated at 488. A ratchet wheel 489, is suitably secured to the idler gear 462, and a spring 491, holds the arm 486, yieldingly against the ratchet wheel 489. During movement of the lever 442, the arm 486, is drawn over the ratchet wheel. The number of teeth 487, in the arm 486, is determined by the surcharge and as shown (Fig. 23) is thirteen so as to effect the recording of thirteen, one-half cent units or six and one-half cents. To accomplish the same result in the mechanism for the fifth to eighth zones, mechanism of the type shown (Fig. 22) is preferably used. The illustration in this figure being for the eighth zone the surcharge mechanism is arranged to register two units or two cents. This is effected through an arm 492, formed integral with the lever 441, and to engage a lever 493, which is pivoted on the jackshaft 435, and carries a pawl segment 494, pivoted at 495, and arranged to engage a ratchet 496, which is suitably secured to a shaft 497, to which the gear 428, of the transfer unit is also secured for rotation therewith. A spring 498, urges the segment 494, into engagement with the ratchet wheel 496, and a spring 499, urges the lever 493, in a counter-clockwise direction. An extending arm 511, of the lever 493, engages the ratchet wheel 496, to limit the counter-clockwise movement of the lever 493. The length of the arm 497, and the number of teeth in the segment 494, and the ratchet wheel 496, are varied to effect other surcharges for other zones.

Movement of the levers 441, and 442, first brings the gears 428, and 327, into mesh or from the position shown (Figs. 23 and 24) to the position shown (Fig. 22) further forward movement is then prevented by hooked ends 512, formed on the plates 426, and 427, and engaging the hub of the levers 441, and 442. Further movement of these levers is permitted by the slotted connection with the links 436, and 437, and through the arms 485, and 492, and the associated mechanism effects the registration of the surcharges.

In the present embodiment the reaction of the scale is utilized for effecting the registering and for this reason it is essential to lock the transfer mechanism in engaged position until the package weighed has been removed from the scale; to accomplish this a countershaft 513, is arranged in the housing and to extend over the levers 86, latch levers 514, are suspended therefrom to engage the pins 446, of the levers 86, while the gear 428, of any one of the transfer units is in mesh with one of the gears 327. Springs 515, urge the latches into engagement with the pins 446, as indicated, (Fig. 19) and a pin 516, extending through the shaft to engage a lug 517, on the latch 514, provides a means for releasing the latches. A crank arm 518, is secured to one end of the shaft 513, and a release key 519, is suitably secured thereto for rocking the shaft to release any one of the latches.

To provide means for making printed records of the registering mechanism a paper supply rack 521, a platen 522, and copy ribbons 523, are provided. The supply rack 521, is arranged to support from one to three or more paper rolls 524, through spindles 525, extending through the rolls and engaging in inclined slots 526, formed in spaced end bearing plates 527, which are secured to the hinged cover 130, of the housing. Paper from the rolls 524, is fed in superimposed relation over an idler roller 528, then over a feed roller 529, and across a table 531. The feed roller 529, is secured to a shaft 532, which also provides a hinge pin through which the table 531, is connected to the cover 130, and is provided with a crank 533, for manually advancing the paper to and across the table 531. The double hinged connections of the table 531, and cover 130, permit the opening of the apparatus for renewing the paper supply or the rolls 120, and 524, and for resetting the recording devices or units.

The table is formed with suitable openings 534, through which the registering units are exposed for printing (Fig. 14) and a mask plate 535, is suitably secured to the table 531, for confining or masking the openings. Fixed characters 536, are or may be formed in the mask plate 535, for recording, on all tickets or slips of paper delivered by the machine, characters for identifying the machine, locality, time, and the like.

A cutting strip 537 having a cutting edge 538, across which the paper may be torn or cut after printing, is secured to the table 531 by means of screws 539.

The copy ribbons 523, (Figs. 1, 10, 11 and 17) are arranged transversely with respect to the paper supply and over and across the mask plate 535, between the paper and recording units 301 to 310, inclusive.

A supply spool 541, is supported between spaced brackets 542, and 543, secured to the housing by means of screws 544, adjacent one end of the table 531, and a takeup spool 545, is mounted between similar brackets 546, and 547, at the opposite end of the table 531. A knob 548, is or may be provided for periodically advancing the ribbon. An idler roller 549, is rotatably mounted in the table 531, adjacent the spool 545, and a similar roller 551, is secured to the table 531, adjacent the spool 541, through brackets 552, suitably secured to the table. These rollers guide the ribbon in a substantially horizontal plane across the table 531, and reduce friction and wear on the ribbon. One ribbon 523, is provided for each paper roll 524, so that there will be a copy ribbon interposed between each sheet or strip of paper upon which copy is to be printed. The ribbons are laced between the paper as indicated, (Fig. 17).

In the present embodiment the three ribbons 523, shown are wound on single supply and takeup spools. It is obvious that individual supply and takeup spools may be provided.

From the foregoing it will be apparent that stamped impressions may be taken from the computing and registering units 301 to 310 inclusive by the application of pressure to the paper extending over the recording units and table 531 and to provide a means for accomplishing this I have shown (Figs. 1, 5, 10 and 11) a roller platen 555. It is arranged for movement across the table 531 for making the impressions. The platen roller 555 is rotatably mounted in a yoke 556, having a hinged connection with a carrier bracket 557, through a shaft 558 extending through lugs, on the yoke 556, and similar lugs formed on the bracket 557. The bracket 557, is hingedly connected with the cover 130, of the housing through a shaft 561, which extends through bearing lugs formed on the bracket 557, and companion lugs 563, formed on the cover 130.

The yoke 556, is formed of spaced and substantially parallel arms 564, connected by a plate 565, which is formed to provide a longitudinal concave surface 566, and a perpendicular web 567, which may be engaged by an operator for moving the roller 555 across the table 531. The platen roller 555, is preferably formed of a soft rubber sleeve 568, mounted on a solid cylindrical core 569, which is rotatably mounted on a shaft 570, which is secured in end bearings 571, and 572, of the yoke 556 by means of pins 573. Lugs 574, extend from the bearing lugs 559 to receive springs 575, which are anchored on pins 576, mounted on the bracket 557, and normally lift the platen roller 555 from the table 531. Lugs 577, formed on the bracket 557 adjacent the lugs 574, limit the lifting movement of the platen roller 555.

The compression spring 578 is mounted over a plunger, 579, which is pivotally connected to a lug 580 formed on the bracket 557 through a pin 581. The spring 578, urges the bracket 557 about the shaft 561 in a counter-clockwise direction or to retract the roller 555 and movement in this direction is limited by stop lugs 582 depending from the bearing lugs 562 of the bracket 557. The plunger 579, extends through an aperture 583, in the cover 130 and is held in alignment thereby.

It is desirable to advance the paper stock from the rolls 524 automatically after an impression is taken and to provide a means for accomplishing this a ratchet 584, is secured to the shaft 532 to which the feed roller 529, is also secured, preferably between the operating handle 533, and a bearing portion 585, forming a part of the table 531. A ratchet pawl 586, having a plurality of ratchet teeth 587, formed along the surface thereof, and to rotate the ratchet 584, is pivoted on a shoulder stud 588, to the bracket 557. A companion bracket 589, is secured to the shaft 588, by means of pins 590, to which the lug 559 of the yoke 556 is also secured, by means of a pin 591 (Fig. 10). The bracket 589 is provided with an arm 592, in which a set screw 593 has threaded engagement and is arranged to engage a laterally extending lug 594, formed on the pawl 586. A spring 595 connecting the pawl 586 and the arm 592 tends to hold the pawl 586 in contact with the screw 593. The screw 593 is adjusted to permit the pawl 586 to engage the ratchet 584 only when the platen 555 is raised from the table 531, as shown (Fig. 5), and to disengage the pawl from the ratchet while the platen is being moved across the table for making impressions. A locknut 596, locks the screw 593 in the adjusted position. A guard disc 597, is mounted adjacent the ratchet 584 to insure engagement between the pawl 586 and the ratchet.

Operation

A package placed on the platform 145 through the scale mechanism raises the yoke formed by the links or plates 163 and 164 and likewise the gauge plate 375 in proportion to the weight of the package. The depression of the key 210 releases the cylinder 12 for recording or determining the postal charges including surcharges for each package. Depression of one of the zone keys 88 effects printing of the postal charges, including surcharges of each package on the ribbon R through the platen 87 associated with the platen key 88, and as an incident to the depression of the key 88 the arm 444 of the corresponding lever 441 or 442, rotates the shaft 443, and through the arm 417, depresses the plunger 414 to release the bar 391. The spring 405 moves the roller 393 of the bar 391 into contact with the cam face 376 of the gauge plate 377, co-incident with the rocking of the shaft 443. The corresponding gear 428 is moved into engagement with the gear 327 of the registering unit individualized to the postal zone represented by the depression key 88 and after moving the gear 428 into contact with the gear 327, and by further movement of the arm 444, the surcharge is registered into the registering unit as above described. After the surcharge is registered the arm 444 and key 88 are permitted to return part way and are latched in an intermediate position by the hooks 514. The package weighed is then removed from the scale and the postal charge is co-incidentally registered in the connected registering unit, the bar 391 is again latched in retracted position by the pawl 411 engaging in the notch 412 and upon depression of the release key 519, the zone key 88 and associated mechanism is permitted to return to normal position, simultaneously feeding a gummed printed ticket 601 (Fig. 21) stamped with characters indicating the postal charges for the package which may be applied to the package in any suitable manner. This operation is repeated many times during extended periods of use and at the end of the periods the platen 555 is pressed against the bed 531 and moved across the bed one or more times or until a clear impression is made, when the platen is permitted to raise, engaging the pawl 586 with the ratchet 584 causing an advance of the paper, upon which the total record for the period is printed, through the knife 537. The ends of the paper may then be grasped and the paper torn or sheared across the edge 538 of the knife 537 to separate the ticket 311, singularly or in multiple, depending upon the number of paper rolls 524 arranged in the machine and bearing the totals of the postal charges for all of the packages for each of the respective postal zones, a record of the total charges for all packages sent to all zones, and groups of characters 602 and 603 for identifying the machine from which the record is taken, the identity of the zone and the period covered by the record.

It is thought that the invention and many of its attendant advantages will be understood from the foregoing description, and it will be apparent that various changes may be made in the form, construction, and arrangement of the parts without departing from the spirit and scope of the invention, or sacrificing all of its material advantages, the form hereinbefore described being merely a preferred embodiment thereof.

We claim:

1. A parcel post scale embodying a shiftable weighing member adapted to be actuated by the weight of parcels, a plurality of manually controlled zone actuators, computing and registering devices for the individual zones, and a totalizing register for all of the zones, operative connections between the shiftable member, the zone actuators and the computing and registering devices for totalling the individual postal charges for a series of parcels proportional to the weight of said parcels, according to zones, and for further totaling the charges in all zones, said manually controlled zone actuators including means for entering predetermined zone surcharges into said registering devices.

2. A parcel post device comprising, in combination, a scale having a part movable according to weight, computing and registering devices, means for selectively connecting the scale with the computing and registering devices and actuated by movement of said part for entering parcel post charges proportionate to the weight of the parcels weighed into said registering devices, said connecting means including devices for entering predetermined zone surcharges for said parcels into said registering devices.

3. A parcel post mechanism comprising the combination of a scale for weighing parcels, said scale having a member movable according to weight of parcels, separate zone registering devices, means automatically actuated by movement of the movable scale member for automatically entering the postal charge for any particular zone to which a parcel is to be mailed in a corresponding registering device, said charge being proportional to the weight of the parcel, and additional means cooperating with said automatic entering means for entering predetermined zone surcharges for the parcel weighed.

4. A parcel post machine comprising in combination computing, and registering devices a weighing scale having a part movable according to weight, a zone key, printing mechanism operated thereby, connections from the movable part to the computing and registering devices controlled by said key, and surcharge entering mechanism operated by said key.

5. A parcel post machine comprising in combination a scale for weighing parcels, said scale having a part movable according to weight, computing and registering devices, means for selectively connecting the movable part with the computing and registering devices for entering into said registering devices parcel post charges for various postal zones proportionate to the weight of the parcels weighed, said connecting means including devices for entering into said registering devices predetermined zone surcharges for each of said parcels, said registering devices comprising a plurality of registers for accumulating, respectively, the total charges for each zone.

6. A parcel post machine comprising in combination a scale for weighing parcel post, said scale having a part movable according to weight, computing and registering devices, means for selectively connecting the movable part with the computing and registering devices for entering into said registering devices parcel post charges proportionate to the weight of the articles weighed, said connecting means including devices for entering into said registering devices predetermined zone surcharges for each of said parcels, said registering devices including a register for accumulating the total of all of said charges for all the zones.

7. A parcel post machine comprising in combination a scale for weighing parcel post, said scale having a part movable according to weight, computing and registering devices, means for selectively connecting the movable part with the computing and registering devices for entering into said registering devices parcel post charges proportionate to the weight of the parcels weighed, said connecting means including devices for entering into said registering devices the zone surcharges of each of said parcels, said registering devices comprising a plurality of registers for accumulating, respectively, the total charges for each zone and a register for accumulating the total of all of said charges for all the zones.

8. A parcel post machine comprising in combination computing and registering devices, surcharge mechanisms for entering predetermined fixed values into said registering devices, a weighing scale having a part movable according to weight, a plurality of zone keys, connections between the movable part and the computing and registering devices controlled by said keys and connections between said keys and said surcharge mechanisms for operating the latter.

9. A machine comprising computing and registering devices, means movable to a position representative of one variable to be computed for controlling the entry into the registering devices, selective means movable in accordance with other variables to be computed for modifying the control of the registering devices by the first means, and means operable with said previously mentioned selective means for entering variable predetermined fixed additional amounts into the registering devices.

10. A machine comprising computing and registering devices, means movable to a position representative of one variable to be computed for controlling the entry into the registering devices, selective means movable in accordance with other variables to be computed for modifying the control of the registering devices by the first means, and means controlled by said second means for entering fixed amounts bearing predetermined relations to the second variables into the registering devices.

11. A machine comprising computing and registering devices, a scale member movable to a position according to weight having operating connections with the computing and registering devices, rate keys having provisions for varying the operating connections between the scale member and said devices, and means controlled by the operation of a key for entering into a registering device an additional amount bearing a predetermined relation to the rate value represented by that key.

12. A machine comprising computing and registering devices, a scale member movable to a position according to weight having means controlling the entry into the registering devices, rate keys having provisions for varying the operating connections between the scale member and the registering devices so that on operation of the parts the registering devices will be moved in accordance with the product of weight and rate, and means operated by each rate key for entering into a registering device as an incident to operation of that key a fixed sum bearing a predetermined relation to the rate value represented by that key.

13. A machine comprising computing and registering devices, a shaft operated by a scale mechanism in accordance with weight, a series of operating connections between the shaft and the registering devices, a corresponding series of rate keys, means controlled by each key for establishing its corresponding operating connection, and means operated by each key for entering a fixed amount bearing a predetermined relation to that key into its registering device.

14. A machine comprising computing and registering devices, a shaft operated by a scale mechanism in accordance with weight, a series of operating connections between the shaft and the registering devices, a corresponding series of rate keys, means controlled by each key for establishing its corresponding operating connection, means operated by each key for entering a fixed amount bearing a predetermined relation to that key into its registering device, said registering devices comprising register for each cost key and a total register for all keys.

15. A computing machine comprising a scale, a cam, means for operating the cam to differential position as the scale is moved to differential position in accordance with weight and for returning the cam to normal position as the scale is returned to normal position, a member, means to engage the member against the cam after the latter has been set to differential position, the member being returned to normal by the cam as the latter is returned to normal, a register, and means to operate the register by the member as the member is returned to normal position.

16. A parcel post machine comprising in combination a scale for weighing parcel post, said scale having a part movable according to weight, computing and registering devices, and means for selectively connecting the movable part with the computing and registering devices and including instrumentalities for entering parcel post charges proportionate to the weight of the parcels weighed into said registering devices and including further instrumentalities for entering fixed charges into said registering devices.

FRANK B. MULFORD.
RAYMOND D. SCHNOOR.